(12) United States Patent
Carrer Vives et al.

(10) Patent No.: US 12,365,099 B2
(45) Date of Patent: Jul. 22, 2025

(54) DEVICE AND METHOD FOR HANDLING ELEMENTS

(71) Applicant: OPEN MIND VENTURES, S.L.U., Igualada (ES)

(72) Inventors: Josep M. Carrer Vives, Igualada (ES); Bernat Balsells Vives, Igualada (ES); Antoni Guimera Pedrola, Igualada (ES); Santiago Lucas Serra, Igualada (ES); Antoni Balsells Mercade, Igualada (ES)

(73) Assignee: Open Mind Ventures, S.L.U., Igualada (ES)

( * ) Notice: Subject to any disclaimer, the term of this patent is extended or adjusted under 35 U.S.C. 154(b) by 0 days.

(21) Appl. No.: 18/706,571

(22) PCT Filed: Nov. 2, 2022

(86) PCT No.: PCT/ES2022/070706
§ 371 (c)(1),
(2) Date: May 1, 2024

(87) PCT Pub. No.: WO2023/079203
PCT Pub. Date: May 11, 2023

(65) Prior Publication Data
US 2025/0010491 A1    Jan. 9, 2025

(30) Foreign Application Priority Data
Nov. 3, 2021    (EP) ..................................... 21382990

(51) Int. Cl.
*B25J 15/00*    (2006.01)
*B65H 3/32*    (2006.01)
*B66C 1/32*    (2006.01)

(52) U.S. Cl.
CPC ............. *B25J 15/0033* (2013.01); *B66C 1/32* (2013.01); *B65H 3/322* (2013.01)

(58) Field of Classification Search
CPC ........ B25J 15/0033; B66C 1/32; B65H 3/322; B65H 3/325
(Continued)

(56) References Cited

U.S. PATENT DOCUMENTS 3,424,488 A * 1/1969 Renfroe .................... B66C 1/32
                                                  294/67.32
3,559,371 A * 2/1971 Borrowman ............ B65B 23/02
                                                    53/390
(Continued)

FOREIGN PATENT DOCUMENTS

EP    1585057 A8    10/2005
EP    1585057 A1    12/2005
(Continued)

OTHER PUBLICATIONS

International Search Report and Written Opinion for PCT/ES2022/070706; European Patent Office; Norman Van Aken; 14 pages; Feb. 10, 2023.

*Primary Examiner* — James R Bidwell
(74) *Attorney, Agent, or Firm* — Dicke, Billig & Czaja, PLLC (57) ABSTRACT

A device for handling elements comprises a shank provided with a stop; a rod which is longitudinally movable and rotatable with respect to the shank, comprising a flap at one end thereof, so as to define a clamp between the stop and the flap for gripping an element. A method comprises placing elements separated by at least one slit on a surface; inserting a tip of a shank provided with a flap inside the slit; placing a stop in contact with an upper part of the element; rotating (Continued)

the shank, holding the element on the upper part by the stop and on a lower part by the flap; and separating the element.

11 Claims, 7 Drawing Sheets

(58) Field of Classification Search
USPC .......................................... 294/81.52, 67.32
See application file for complete search history.

(56) References Cited

U.S. PATENT DOCUMENTS

| | | | | |
|---|---|---|---|---|
| 4,055,258 | A | * | 10/1977 | Schneider .............. B65H 3/322 414/796 |
| 4,975,018 | A | * | 12/1990 | Langenbacher ......... B25J 15/10 414/662 |
| 5,310,304 | A | * | 5/1994 | Baumgartner ............ B66C 1/28 414/626 |
| 8,562,047 | B2 | * | 10/2013 | Parker ...................... B66C 1/66 294/82.16 |

FOREIGN PATENT DOCUMENTS

| | | | |
|---|---|---|---|
| GB | 1267178 A | * | 3/1972 |
| WO | 2012069056 A1 | | 5/2012 |
| WO | 2015147725 A1 | | 10/2015 |

\* cited by examiner

DEVICE AND METHOD FOR HANDLING ELEMENTS

OBJECT OF THE INVENTION

The present invention refers to a device and a method for handling elements, which are placed adjacent to each other. In particular, the device is especially designed to grip, suspend, and move a stack of sheet elements, such as pieces of textile materials, sheets of paper or cardboard or thin flexible or rigid metal sheets, adjacent to other stacks and resting on a flexible surface, such as a modular brush surface, without unravelling the stack of sheet material or affecting the adjacent stacks.

BACKGROUND OF THE INVENTION

Preparing a stack of sheet elements for processing, such as a stack of fabric parts, a stack of printing foils or metal foils for stamping, may require the removal of several sheets from the stack or their separation from adjacent stacks.

Several devices are known for handling stacks of adjacent sheet materials. When several stacks are adjacent to each other, only separated by a cutting slit, access through the cutting slit to the bottom of the stack is very difficult in order to grip and subsequently lift and suspend the stack, without affecting the other stacks adjacent to the gripped stack.

The currently existing clamps do not allow access through this very small cutting slit, and therefore can only access the bottom of the stacks in those areas where there is no adjacent stack, which limits the degrees of freedom in handling and therefore the possibility of more efficient handling.

There are known devices that are designed to act on a stack of sheets only through their free side edges, which does not solve the above-mentioned problem.

Therefore, there is still a need for a handling device for adjacent elements that allows the handling of such stacks also through small spaces, such as the cutting slits generated after the longitudinal cut of large stacks.

DESCRIPTION OF THE INVENTION

The object of the invention consists of a device for handling adjacent elements, for example, stacks of sheet elements, boxes, or the like, which allows the grip, suspension and movement of the elements, a stack of sheet elements, such as, for example, stacked pieces of fabric which are subjected to multilayer, or single layer, cutting processes following clothing patterns, without unravelling said stack of sheet material.

The device according to the present invention is defined in claim 1 and is configured to be able to access the lower part of the element, and thus to be able to proceed to the manipulation of the elements, without the need to access only through free edges of said elements, but even through gaps or small longitudinal slits generated in the cutting processes, thus overcoming the limitations of the present state of the art.

For this purpose, according to one embodiment, the device comprises a hollow shank, with an upper end through which it can be coupled to a robotic arm or similar element, and a lower end with a flared, circular, rectangular, or other geometry adapted to the element to be manipulated, through which the hollow interior of the shank is accessed, and which acts as a wedge or upper clamping support for the stack.

Inside this hollow shank, a grip rod rotates and telescopically moves, ending in a lower flap perpendicular to the rod that acts as a finger or lower support for the stack.

The rod, and therefore the flap, can rotate in the horizontal plane and move vertically to allow the object to be gripped. The rotation allows it to penetrate along the direction of the slit or separation between adjacent stacks or adjacent elements, so that once it has penetrated below the lowest substrate of the stack, it can rotate until the lower flap is arranged in an optimal position for gripping, for example, in the preferred design, at 90°. The flexible bristles of the brush, which form the surface on which the stacks of sheet material rest, allow this rotation without moving the object to be gripped from the surface.

Once the stack has been gripped by at least one of its edges, the device allows its suspension and movement. In the specific case of fabric pieces, the device simplifies the automation to extract the cut patterns by means of robots.

In an alternative embodiment of the device, it additionally incorporates means of adjustment, linked to the driving means and equipped with quick locking and unlocking elements, for generating and maintaining additional pressure that helps to hold the stack.

Additional features of the device in accordance with the present invention are described in the dependent claims.

In one possible embodiment, the device is part of an overall system that can work in different interrelated or consecutive modules:

Stack grouping and labelling module: The objective is to group the different stacks of extracted elements with one or more devices according to surface, weight, and other attributes and to assign a code for the tracking of the whole. Due to the low intervention of the device in the fabric, the individual tasks of gripping the stacks do not involve large movements of the device placement system, as opposed to a full motion of consecutive gripping and removal of the pile; i.e., time is optimized if all devices are placed and subsequently removed, than not if a device is placed in a first stack, said first stack is removed, the next device is placed in a second stack, said second stack is removed, and so on. In addition, this module also applies a label to the grouped stacks, such as a printed, RFID, electronic ink, or similar label, in order to track the grouped stacks.

Module for gripping the elements and classification: Once the elements are fixed, they are gripped with tolerance to possible movements since they could be detected in a simple way (vision sensors, magnetic, radiofrequency reading . . . ) the real point where the manipulation devices are located. This module could contemplate manual or automatic collection.

In addition, the gripping device has the necessary morphology to be able to be collected manually or automatically, and to be deposited in a sorting or storage system, preferably vertical to optimize space.

When a material requires multiple devices, they can be picked up sequentially or simultaneously depending on the rigidity, flexibility or needs of the material to be picked up. Simultaneous picking can be carried out by means of structural elements, plates, etc. that have the fixing elements (mechanical, magnetic, etc.) of the devices. These elements are conveniently distributed for this purpose.

This overall system may include means for real-time, automated tracking of adjacent elements being handled, which may incorporate means of identification, such as RFID tags, bar codes, QR codes, electronic ink displays, or the like.

According to a second aspect, the present invention also relates to a method for handling elements, comprising the following steps:
- placing adjacent elements separated by at least one slit or gap on a surface;
- inserting a tip of a rod provided with a flap into the slit or gap;
- placing a stop in contact with the upper element;
- rotating the rod so that the flap is below the bottom of the shank,
- retracting the rod, until the flap exerts the desired pressure, holding the element at the top by means of the stop and at the bottom by means of the flap; and
- separating the clamped element from the support surface by means of the stop and the flap.

Alternatively, the upper stop could be moved integrally with the lower flap before holding.

DESCRIPTION OF THE DRAWINGS

To complement the description being made and in order to assist in a better understanding of the features of the invention, in accordance with a preferred example of a practical embodiment thereof, there is attached as an integral part of said description a set of drawings in which, by way of illustration and not limitation, the following has been depicted:

FIGS. 7.1 and 7.2.—Show views of a third alternative embodiment of the device.

DESCRIPTION OF PREFERRED EMBODIMENTS OF THE INVENTION

Hereinafter, with the aid of the figures referred previously, a detailed explanation of preferred embodiments of the object of the present invention is provided.

First of all, it should be indicated that for reasons of simplicity the description of the present invention is made with reference to a stack of sheet elements. However, the device and the method according to the present invention can also be used to handle any other adjacent elements, separated by a slit or a gap.

The described device for handling stacks of sheet elements allows the grip, suspension, and movement of a stack (1) of sheet elements, from a plurality of consecutive and adjacent stacks (1), separated from each other by respective slits (2) generated by a previous method of multilayer cutting of the stack (1) of sheet elements.

The consecutive stacks (1) are arranged on a surface (3), such as a conveyor belt or the like. In the embodiment shown in the attached figures, the surface (3) is formed by a series of flexible brushes on which the stacks (1) rest, although it could also be foam, carpet, or the like.

The device is configured to be able to access the underside of the lower sheet elements of the stack (1) through the slits (2).

The device comprises a hollow outer shank (4), the interior of which houses a rod (5).

Figure 1:
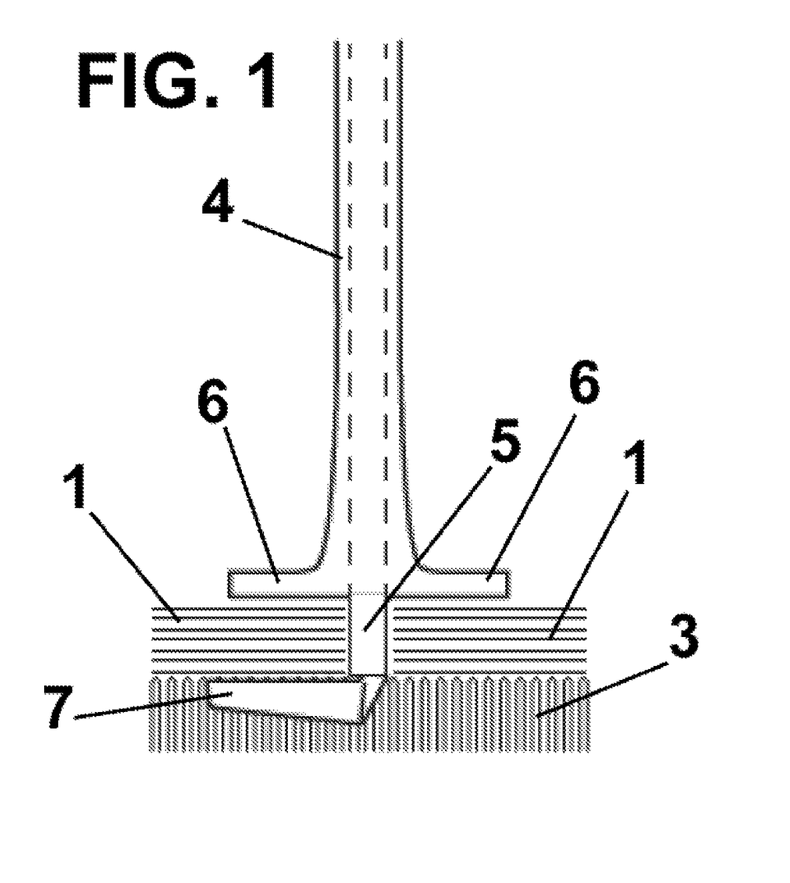
FIG. 1.—Shows a detailed view of the handling device in use.

The shank (4) has an upper end (not shown in the figures), through which it is engageable to a robotic arm or similar element, and a lower end, provided with a stop (6), which is preferably perpendicular to a longitudinal axis of the shank (4). The lower end further comprises a mouth through which protrudes a lower end of the rod (5) housed inside the stem (4), as shown in FIG. 1.

It should be noted that the shank (4) may be fixedly engaged to a robotic arm or be free. In the latter case, the shank (4) has a morphology that allows it to be easily gripped, for example, by means of a magnet, a hook, an eyelet, or the like, either manually or automatically.

The rod (5) can move longitudinally inside the shank (4) and can rotate with respect to the longitudinal axis of the shank (4).

Said rod (5) comprises a flap (7) at its lower end, which is substantially perpendicular with respect to the longitudinal axis of the rod (5). As illustrated in the attached figures, the flap (7) preferably has a geometry which narrows towards its distal end, with respect to the shank (4), and presents rounded edges to facilitate the movement and avoid possible damages to the sheet elements of the stack (1) and to the brushes forming the surface (3).

This flap (7), together with the stop (6), defines a gripping clamp for holding a stack (1) of sheet elements for its handling.

Figure 4:
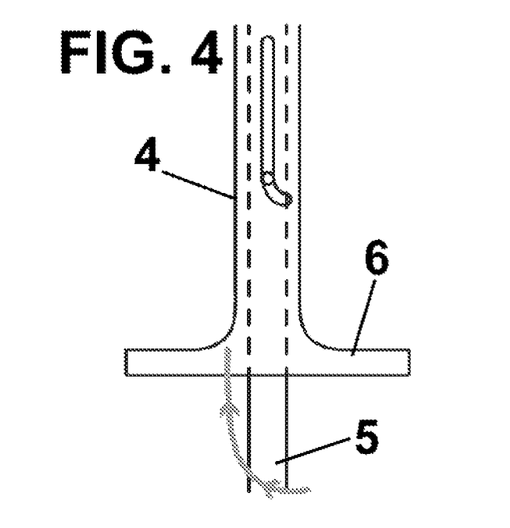
FIG. 4.—Shows an elevation view of an example of driving means of the device.

The device also comprises driving means that control the positioning and compression operations of the elements of the device. Among others, the driving means control the rotations and longitudinal movements of the rod (5) inside the shank (4), and therefore the rotations and movements of the flap (7). These driving and rotation means may be, for example, an oblong slit in the shank (4) with a pin in the rod (5), as shown in FIG. 4, slits in the internal axis of the shank, or multiple slits in the shank and balls as bearings to reduce friction. It may also be that the stem (4) and the rod (5) rotate freely with respect to each other, and the rotation and longitudinal movement are fixed manually or with a motor, with anti-backlash bearings or with ratchet systems among many other possible existing angular or linear rotation and fixing systems that may be incorporated into the device.

Figure 2:
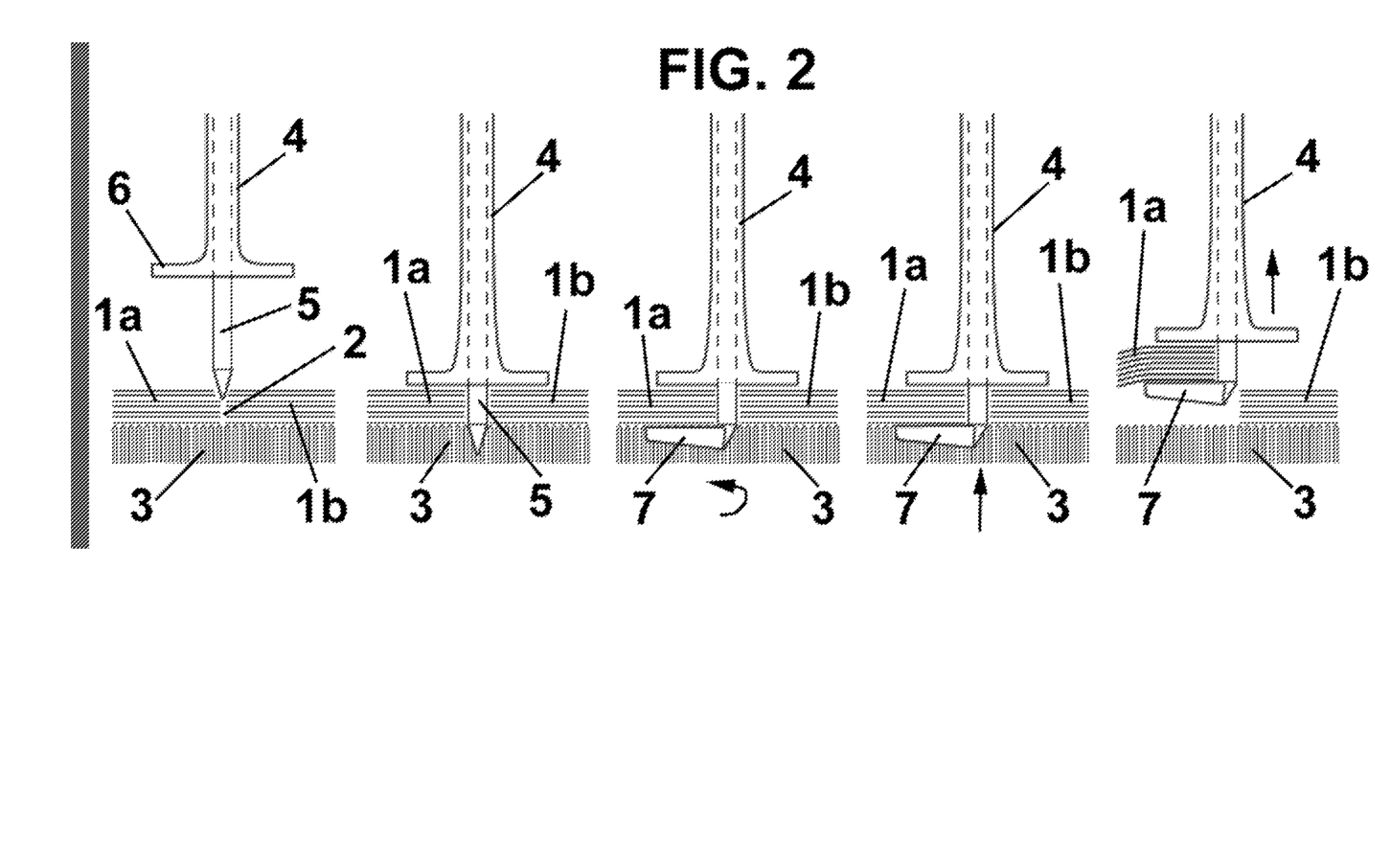
FIG. 2.—Shows a driving sequence of the handling device on a stack of sheet elements.
Figure 3:
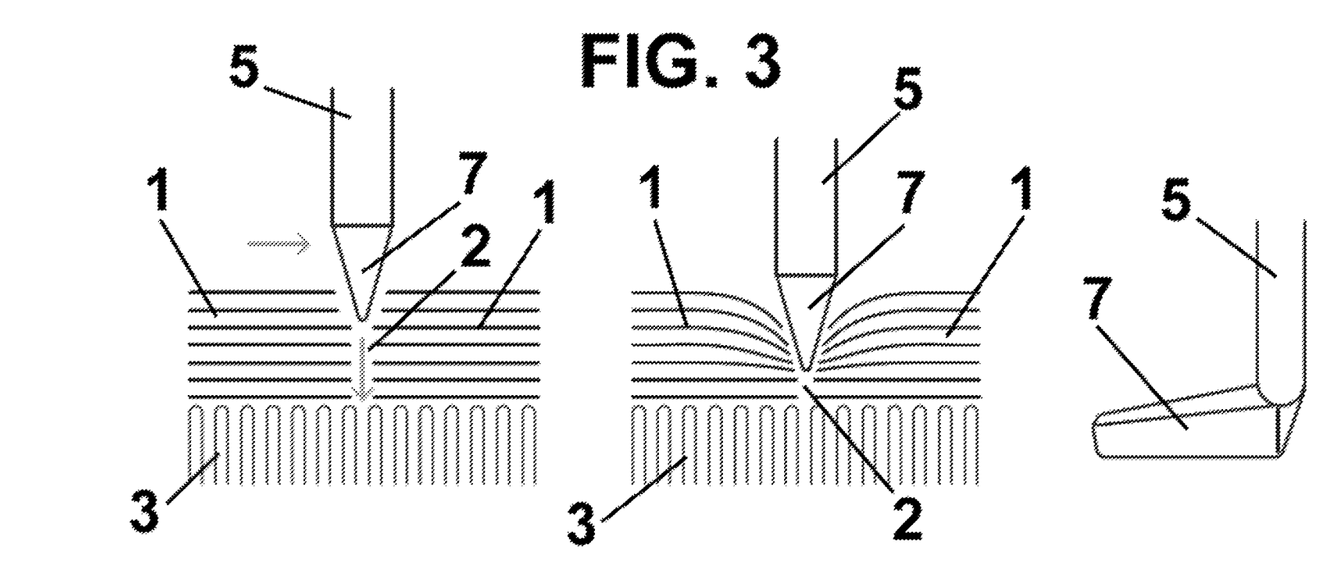
FIG. 3.—Shows a detail of the driving of the lower flap on the sheet elements.

FIG. 2 illustrates the driving sequence of the device for handling a stack (1a) and separating it from other adjacent stacks (1b) and from the flexible surface (3) on which it rests. As can be seen, the device is placed, by means of a robotic arm or similar, perpendicularly over a slit (2) that separates a stack (1a) to be handled from the adjacent ones.

The robotic arm (not shown) approaches the flap (7) of the device to the slit (2) and the shank (4) moving it until the stop (6) of the device comes into contact with the upper sheet element of the stack (1a) to be handled and of the immediately adjacent stack (1b), so that the flap (7) penetrates through the corresponding slit (2).

As can be seen, for penetration through the slit (2) said flap (7) is arranged parallel to the facing side edges of the stack (1a), and transversal, therefore, to the stop (6).

When the flap (7) is inside the surface (3) and below the lower element of the stack (1a), the driving means rotate the rod (5) and, therefore, said flap (7), so that the latter is arranged perpendicularly with respect to the slit (2) and below the lower sheet element of the stack (1a) and substantially parallel to the stop (6), as shown in the detail of FIG. 2.

This way, the lateral edge of the stack (1a) is gripped at the top by the stop (6) and at the bottom by the flap (7). At this point, the driving means move the rod (5), and thus the flap (7), longitudinally upwards in order to adjust the grip of the edge of the stack (1a).

Subsequently, the robotic arm (not shown) moves the device or devices upwardly, thus lifting the stack (1a) by the gripped edge to separate it from the adjacent stack (1b) and from the surface (3), thus being able to move it to another point.

In the preferred embodiment of the device, the rotation and vertical displacement movements of the rod (5) can be made in a single step by means of an oblong guiding slit along an axis, so that the rotation is performed in a manner similar to a worm screw, as can be seen in FIG. 4.

In an alternative embodiment of the device, it additionally incorporates adjustment means (8), linked to the driving means and comprising quick locking and unlocking elements, for generating additional pressure to assist in holding the stack (1).

Figure 5:
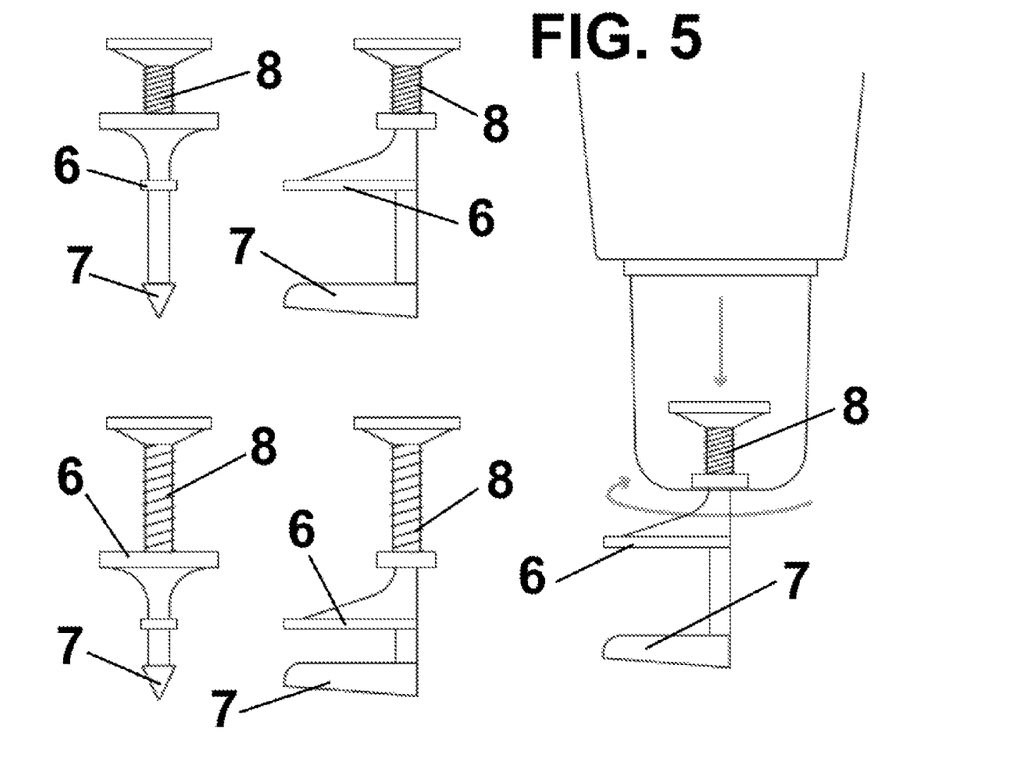
FIG. 5.—Shows a first alternative embodiment of the device.

FIG. 5 shows views of a first alternative embodiment, in which the adjustment means (8) consist of a pre-tensioned spring which can be actuated by the robotic head to which the device is attached or a spindle which is also driven. Said robotic head presses the spring of the adjustment means (8) or moves through the spindle (8) and separates the flap (7) from the stop (6) before positioning the device on a slit (2).

Figure 6:
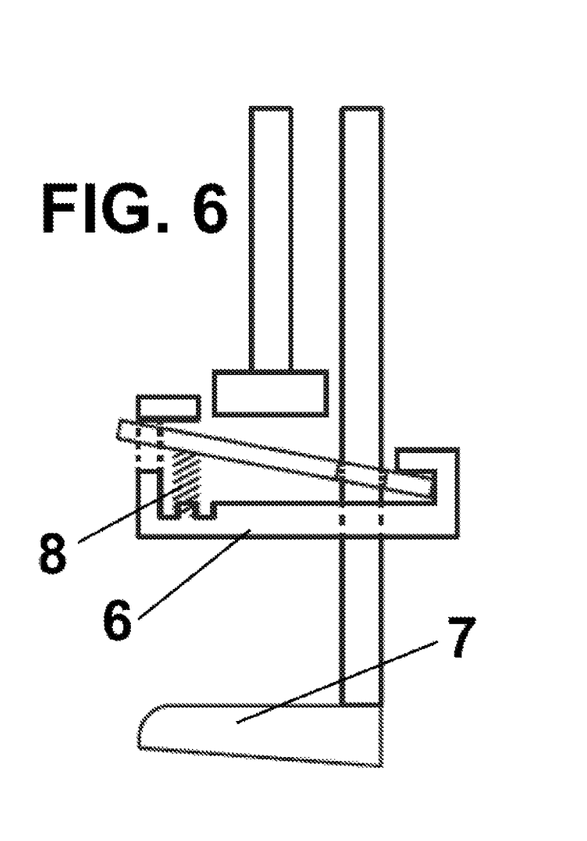
FIG. 6.—Shows views of a second alternative embodiment of the device.

FIG. 6 illustrates a view of a second alternative embodiment, in which the adjustment means (8) consist of a smooth surface, locking zipper and releasing system.

Figure 71:
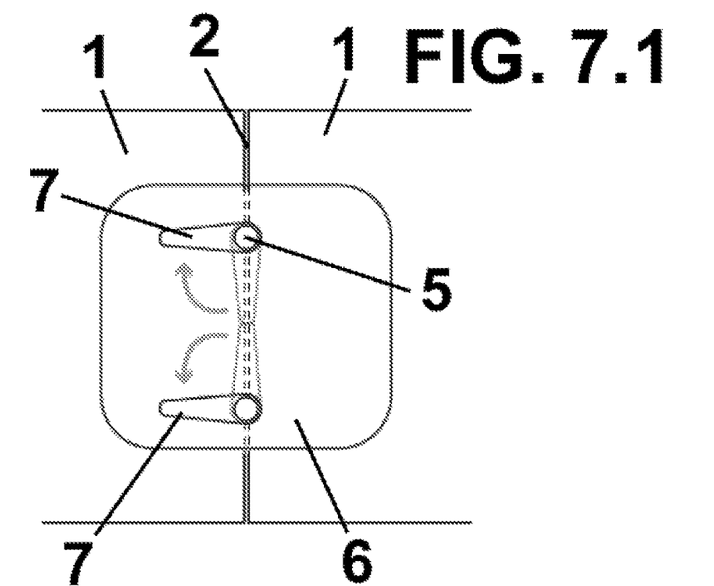
Figure 72:
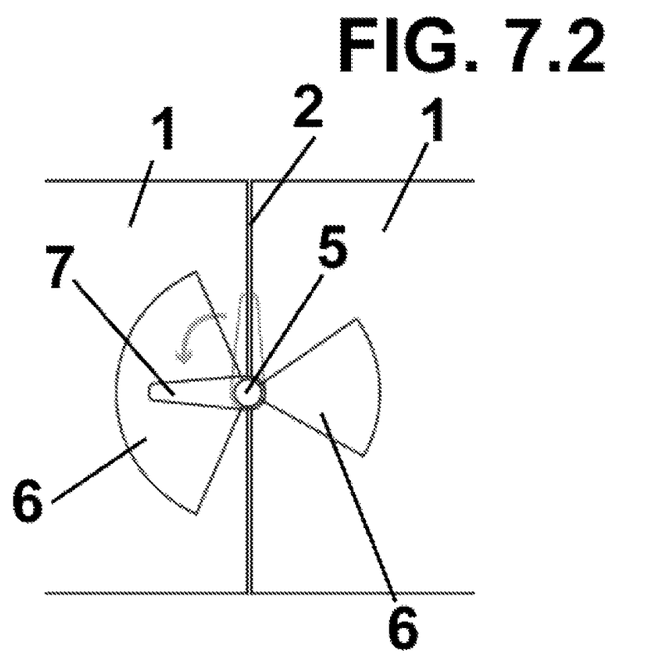

FIGS. 7.1 and 7.2 illustrate alternative embodiments of the device. FIG. 7.1 shows a plan view of a device comprising two rods (5) and two corresponding rotating flaps (7) to improve the grip and stability of the gripped stack (1).

FIG. 7.2 shows a plan view of a device in which the arm (6) has two sectors of different morphologies to contribute to an optimal gripping of the stack (1).

Figure 8:
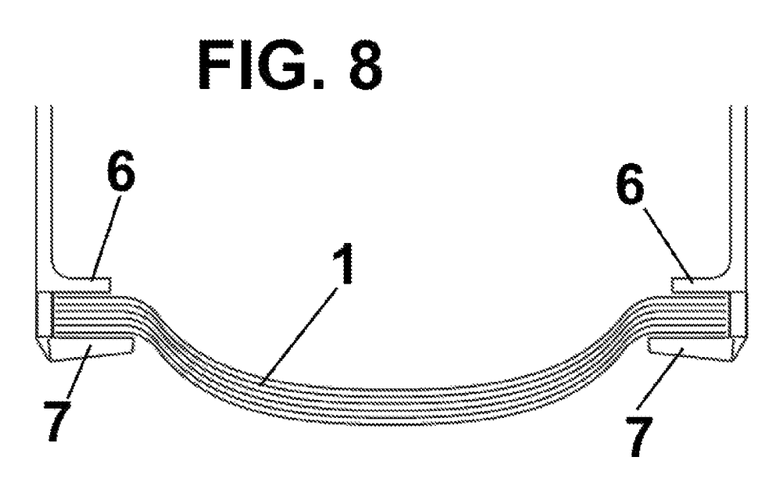
FIG. 8.—Shows the use of the device during the movement of a stack.

Finally, FIG. 8 shows the use of the device during the transport of a stack (1).

Although reference has been made to a specific embodiment of the invention, it is obvious for a person skilled in the art that the device and method described are susceptible of numerous variations and modifications, and that all the details mentioned may be replaced by other technically equivalent ones, without departing from the scope of protection defined by the appended claims.

The invention claimed is:

1. Device for handling elements, the elements being separated by at least one slit or gap, characterized in that it comprises:
    a hollow outer shank having a lower end provided with a stop extending outward therefrom perpendicular to a longitudinal axis of the hollow outer shank;
    an interior of the hollow outer shank at least partially housing a rod which is longitudinally movable and rotatable with respect to the hollow outer shank, the lower end of the shank further comprising a mouth through which protrudes a lower end of the rod housed inside the hollow outer shank, the rod comprising a flap at one end, which is substantially perpendicular with respect to the longitudinal axis of the rod, so that a clamp is defined between the stop and the flap for holding an element.

2. Device for handling elements according to claim 1, wherein the clamp is configured and arranged to hold the element proximate one side of the rod.

3. Device for handling elements according to claim 1, wherein the stop is substantially perpendicular with respect to the longitudinal axis of the hollow outer shank.

4. Device for handling elements according claim 1, wherein the flap is substantially perpendicular with respect to the longitudinal axis of the rod.

5. Device for handling elements according to claim 1, further comprising adjustment means linked to driving means for generating additional holding pressure of the element.

6. Device for handling elements according to claim 5, wherein the adjustment means is a pre-tensioned spring or spindle.

7. Device for handling elements according to claim 5, wherein the adjustment means are a smooth surface, era locking zipper and a releasing system.

8. Device for handling elements according to claim 1, comprising driving and fixing means for the movement of the rod with respect to the hollow outer shank.

9. Device for handling elements according to claim 8, wherein the driving means comprise an oblong slit in the hollow outer shank with a pin in the rod.

10. Method for handling elements, characterized in that it comprises the following steps:
    placing elements separated by at least one slit or gap on a surface;
    inserting one end of a rod provided with a flap inside the slit or gap;
    placing a stop in contact with an upper part of said element;
    rotating the rod so that the flap is below a lower part of the element, holding the element on its upper part by means of the stop and on its lower part by means of the flap proximate one side of the rod; and
    separating the element held by the stop and the flap from the surface from another element on the surface.

11. Method for handling elements according to claim 10, wherein the clamp is configured and arranged to hold the element proximate one side of the rod.

* * * * *